United States Patent
Vitanov

(10) Patent No.: US 11,548,480 B2
(45) Date of Patent: Jan. 10, 2023

(54) SENSOR ASSEMBLY CLEANING APPARATUSES

(71) Applicant: Pony AI Inc., Grand Cayman (KY)

(72) Inventor: Anatolii Vitanov, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 330 days.

(21) Appl. No.: 16/713,626

(22) Filed: Dec. 13, 2019

(65) Prior Publication Data

US 2021/0179032 A1 Jun. 17, 2021

(51) Int. Cl.
| | | |
|---|---|---|
| *B60S 1/54* | (2006.01) | |
| *B08B 3/02* | (2006.01) | |
| *B60S 1/56* | (2006.01) | |
| *B60S 1/52* | (2006.01) | |
| *B08B 5/02* | (2006.01) | |
| *H04N 5/217* | (2011.01) | |
| *H04N 5/225* | (2006.01) | |
| *B60R 11/04* | (2006.01) | |

(52) U.S. Cl.
CPC ........... *B60S 1/54* (2013.01); *B08B 3/02* (2013.01); *B08B 5/02* (2013.01); *B60S 1/52* (2013.01); *B60S 1/56* (2013.01); *H04N 5/2171* (2013.01); *H04N 5/2252* (2013.01); *B60R 11/04* (2013.01)

(58) Field of Classification Search
None
See application file for complete search history.

(56) References Cited

U.S. PATENT DOCUMENTS

| | | | | |
|---|---|---|---|---|
| 4,248,383 A | * | 2/1981 | Savage | B60S 1/48 239/284.2 |
| 2002/0005440 A1 | * | 1/2002 | Holt | B05B 15/652 239/284.2 |
| 2003/0155001 A1 | * | 8/2003 | Hoetzer | B60S 1/0822 134/52 |
| 2014/0097272 A1 | * | 4/2014 | Nishio | B60S 1/52 239/284.1 |

(Continued)

FOREIGN PATENT DOCUMENTS

| | | | | |
|---|---|---|---|---|
| DE | 202011105961 U1 | * | 12/2011 | ........... B60S 1/0833 |
| DE | 202015008607 U1 | * | 4/2017 | |

*Primary Examiner* — Spencer E. Bell
*Assistant Examiner* — Omair Chaudhri
(74) *Attorney, Agent, or Firm* — Sheppard Mullin Richter & Hampton LLP

(57) ABSTRACT

Described herein are sensor assembly cleaning apparatuses and methods of operation thereof that utilize a fluid such as pressurized air to cause dispersion of debris, rain droplets/water droplets from other sources, condensation, or any other environmental contaminant that may obscure a transparent surface such as a glass window of a camera housing from the glass window. In this manner, the pressurized air acts to clean the transparent surface, and as a result, improve the clarity of the field-of-view provided through that transparent surface to a camera housed in the camera housing. In addition, sensor assembly cleaning apparatuses described herein can include a water nozzle that is adapted to eject high pressure water onto the transparent surface as well as towards an air nozzle or an air vent that is adapted to eject the pressurized air. The water nozzle can thus be used to remove debris form the air nozzle.

18 Claims, 10 Drawing Sheets

(56) References Cited

U.S. PATENT DOCUMENTS

| | | | | |
|---|---|---|---|---|
| 2015/0183406 A1* | 7/2015 | Tanaka | ............... | B08B 3/02 |
| | | | | 134/99.1 |
| 2015/0367819 A1* | 12/2015 | Bazaz | ............... | B60S 1/54 |
| | | | | 15/313 |
| 2016/0297350 A1* | 10/2016 | Jones | ............... | B60S 1/603 |
| 2019/0077376 A1* | 3/2019 | Baldovino | ............ | B60S 1/52 |
| 2019/0077377 A1* | 3/2019 | Schmidt | ............ | B60S 1/0848 |
| 2019/0161125 A1* | 5/2019 | Schmidt | ............ | B60S 1/46 |
| 2019/0314865 A1* | 10/2019 | Sevak | ............ | G02B 27/0006 |
| 2020/0001832 A1* | 1/2020 | Deane | ............ | B60S 1/52 |
| 2020/0094783 A1* | 3/2020 | Dubey | ............ | B60H 1/00735 |
| 2020/0108801 A1* | 4/2020 | Frederick | ............ | B60S 1/481 |
| 2020/0158098 A1* | 5/2020 | Matsushita | ............ | B60S 1/60 |
| 2020/0180567 A1* | 6/2020 | Sakai | ............ | B60S 1/603 |
| 2020/0262396 A1* | 8/2020 | Keller | ............ | B60S 1/60 |
| 2021/0061237 A1* | 3/2021 | Krishnan | ............ | G01S 17/42 |
| 2021/0101539 A1* | 4/2021 | Krishnan | ............ | B60Q 1/0023 |
| 2021/0197769 A1* | 7/2021 | Shirakura | ............ | B60S 1/56 |

* cited by examiner

SENSOR ASSEMBLY CLEANING APPARATUSES

The present invention relates generally to sensor assembly cleaning apparatuses, and more particularly, in some embodiments, to sensor assembly cleaning apparatuses adapted to eject air onto transparent surfaces of the sensor assembly to remove liquid and/or debris from the surfaces and methods of operation thereof.

BACKGROUND

A vehicle, such as an autonomous vehicle (AV), includes a myriad of sensors that provide continuous streams of sensor data captured from the vehicle's surrounding environment. Such sensor data enables an AV to perform a number of functions that would otherwise be performed by a manual human operator including various vehicle navigation tasks such as vehicle acceleration and deceleration, vehicle braking, vehicle lane changing, adaptive cruise control, blind spot detection, rear-end radar for collision warning or collision avoidance, park assisting, cross-traffic monitoring, emergency braking, and automated distance control.

A vehicle such as an AV can include a variety of different types of on-board sensors including, for example, cameras, light detection and ranging (LiDAR) systems, radar systems, Global Positioning System (GPS) devices, sonar-based sensors, ultrasonic sensors, accelerometers, gyroscopes, magnetometers, inertial measurement units (IMUs), and far infrared (FIR) sensors. On-board vehicle sensors disposed on an exterior of a vehicle may be provided in or integrated with protective housing to protect the sensors from damage from the elements. Despite being encased in housing, some on-board sensors can experience diminished performance as a result of environmental factors to which the housing is subjected. Technical solutions that mitigate the effect of such factors on sensor performance are described herein.

SUMMARY

In an example embodiment, an apparatus for cleaning a sensor assembly includes a first component adapted to eject a fluid onto a transparent surface of the sensor assembly and a second component for supplying the fluid to the first component.

In an example embodiment, the fluid is pressurized air and the first component includes a nozzle or a vent adapted to eject the pressurized air onto the transparent surface of the sensor assembly. In an example embodiment, the nozzle or the vent is positionally adjustable to cause the pressurized air to be ejected onto different portions of the transparent surface of the sensor assembly. In an example embodiment, the ejected pressurized air causes liquid and/or debris present on the transparent surface to disperse towards an edge of the transparent surface.

In an example embodiment, the sensor assembly includes a camera housing that encloses multiple cameras and transparent surface is a camera window that provides at least one of the cameras with a field-of-view of an environment that is external to the camera housing. In example embodiment, the sensor assembly may be provided on a vehicle, and the transparent surface may provide a field-of-view for at least a portion of an environment surrounding the vehicle.

In an example embodiment, the second component is a fluid line for supplying the pressurized air from a supply system to the nozzle or vent. In an example embodiment, a portion of the fluid line extends through the camera housing. In an example embodiment, the fluid line extends around the camera housing. In an example embodiment, the apparatus further includes a second fluid line for supplying the pressurized air to a second nozzle or vent adapted to eject the pressurized air onto a second transparent surface of the camera housing.

In an example embodiment, the apparatus additionally includes a compressor for compressing air to obtain the pressurized air, a tank for storing the pressurized air, and a pressure regulator for regulating the pressure of the pressurized air.

In an example embodiment, a sensor assembly cleaning apparatus with a self-cleaning capability is disclosed. The sensor assembly cleaning apparatus with a self-cleaning capability includes a first component adapted to eject a first fluid onto a transparent surface of a sensor assembly, a second component adapted to supply the first fluid to the first component, and a third component adapted to eject a second fluid onto the transparent surface and onto the first component.

In an example embodiment, the first fluid is pressurized air and the first component is an air nozzle or vent adapted to eject the pressurized air onto the transparent surface. In an example embodiment, the second component is a fluid line adapted to supply the pressurized air to the air nozzle or vent. In an example embodiment, the second fluid is water and the third component is a water nozzle adapted to eject the water at high pressure onto the transparent surface to clean debris from the transparent surface.

In an example embodiment, the water nozzle is adapted to periodically eject the water towards the air nozzle or vent to clean debris from the air nozzle. In an example embodiment, the water nozzle and the air nozzle at located at opposing positions to enable the water nozzle to periodically eject the water towards the air nozzle. In an example embodiment, the water nozzle is adjustable to selectively direct the ejected water to the transparent surface or the air nozzle. In an example embodiment, the fluid line is a first fluid line, and the apparatus further includes a second fluid line adapted to supply the water to the water nozzle.

These and other features of the apparatuses, systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
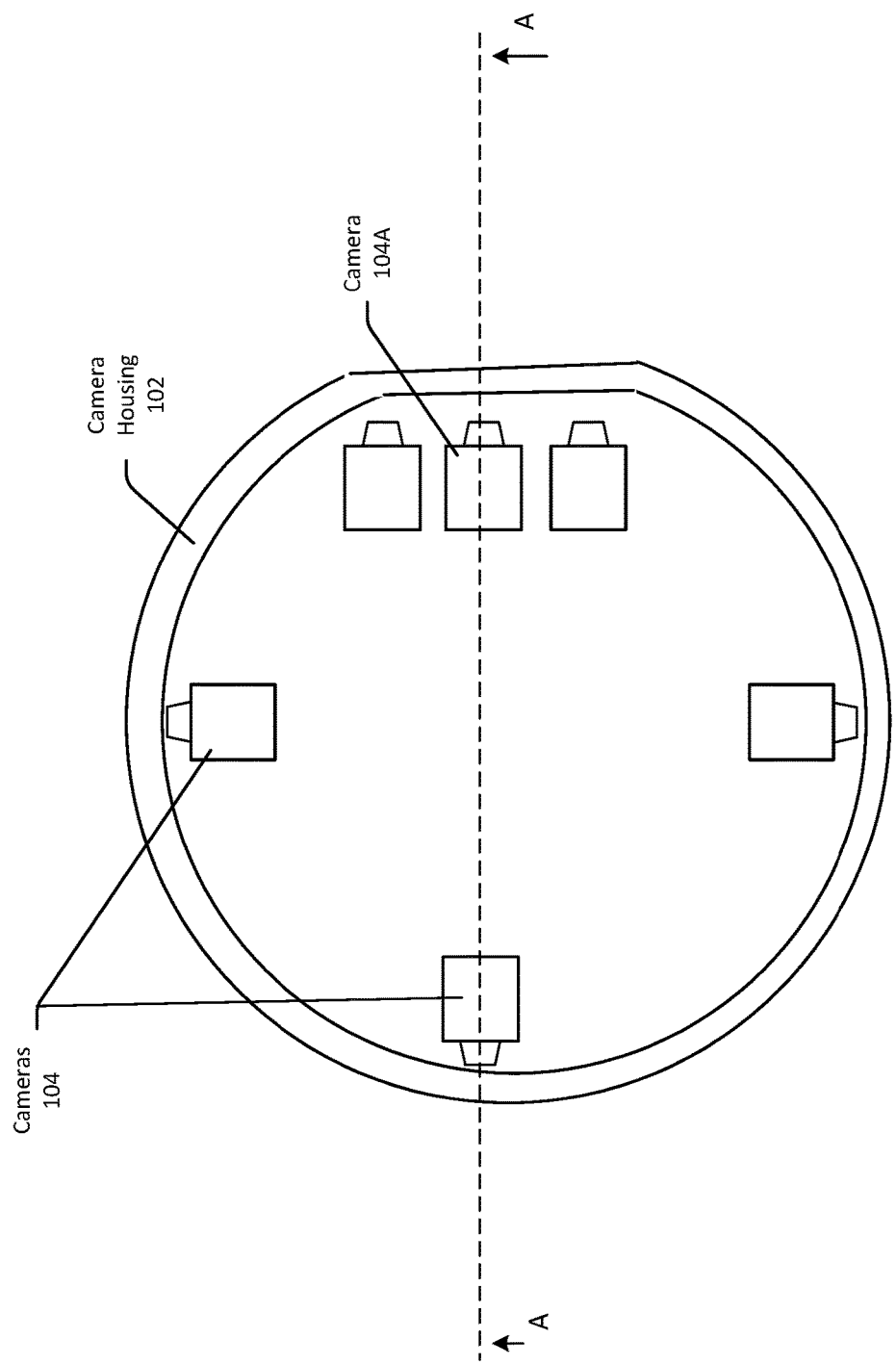
FIG. 1 schematically illustrates a top view of a camera housing that encloses a plurality of cameras in accordance with an example embodiment of the invention.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises," "comprising," "includes," "including," "contains," or "containing" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents and vice versa unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Described herein are sensor assembly cleaning apparatuses and corresponding methods, systems, and non-transitory computer readable media for operating and controlling the operation of such sensor assembly cleaning apparatuses. A vehicle such as an AV may be equipped with a variety of different types of sensors. These sensors are configured to capture sensor data that can be used to facilitate various vehicle operational functions such as vehicle navigation, vehicle acceleration and braking, and so forth. Certain types of sensors such as cameras may be enclosed in a housing that protects the sensors from damage that could result from exposure to environmental elements such as heat, dust, wind, rain, snow, or the like. A camera housing is typically provided with multiple transparent surfaces such as glass windows via which the cameras can capture images of an environment external to a vehicle.

During vehicle operation, these glass windows can become obscured with debris such as dust, for example. In addition, when a vehicle is operated in the rain, droplets of rain can also obscure the glass surfaces. Obscurement of these transparent surfaces, whether from debris or rain or the like, can result in diminished function of the cameras due to diminished image quality of the image data captured by the cameras. This can be particularly dangerous for AVs that rely on the images captured by such cameras for a variety of tasks such as object detection, object classification, object tracking, and the like—all of which are integral to the safe autonomous operation of a vehicle. For example, clear image data is needed to accurately detect the distance between the vehicle and another vehicle and to determine a safe braking distance at the vehicle's current speed; to safely navigate around other vehicles on the road, and so forth.

Described herein are sensor assembly cleaning apparatuses and methods of operation thereof that utilize a fluid such as pressurized air to cause debris; rain droplets or water droplets from other sources; condensation; or any other environmental contaminant that may obscure a transparent surface such as a glass window of a camera housing to be dispersed from the glass window. In this manner, the pressurized air acts to clean the transparent surface, and as a result, improve the clarity of the field-of-view provided through that transparent surface to a camera housed in the camera housing. In example embodiments, the apparatus includes a fluid line for supplying the pressurized air. The fluid line may extend through or around the camera housing. The apparatus may further include a nozzle, a vent, or the like adapted to eject the pressurized air supplied via the fluid line onto or otherwise in the direction of the transparent surface. In certain example embodiments, the nozzle or vent via which the pressurized air is ejected may be positionally adjustable to allow the air to be directed to different portions of the transparent surface. In example embodiments, the sensor assembly cleaning apparatus may include multiple fluid lines and multiple corresponding nozzles, vents, or the like for ejecting pressurized air onto multiple transparent surfaces, potentially at least partially simultaneously.

In example embodiments, a method for controlling the above-described sensor assembly cleaning apparatus includes receiving sensor data from various vehicle sensors, determining a level of obscurement of the transparent surface, and determining whether the level of obscurement exceeds a threshold level. If the transparent surface is obscured beyond the threshold level, the method may further evaluate the vehicle velocity in relation to a threshold vehicle velocity. If the vehicle velocity is determined to be less than the threshold vehicle velocity—which may indicate that the vehicle velocity is insufficient to generate enough naturally circulating wind around the transparent surface to produce a desired cleaning effect—a control signal may be sent to the apparatus to initiate the ejection of pressurized air onto the transparent surface. It should be appreciated that any discussion herein of a first value exceeding a second value also encompasses the first value being greater than or equal to the second value. Similarly, it should be appreciated that any discussion herein of a first value being below or less than a second value also encompasses the first value being less than or equal to the second value.

In some example embodiments, the sensor data includes moisture data indicative of a moisture level of the transparent surface. If, for example, the vehicle is being operated in the rain, the moisture data may indicate a high moisture level due to rain droplets on the transparent surface. In this example embodiment, the level of obscurement may be correlated to the moisture level indicated by the moisture data. In other example embodiments, the sensor data includes image data captured by a camera encased in the camera housing. The image data may indicate an obscured view of the camera through the transparent surface (e.g., glass window of the camera housing). The transparent surface may become obscured by contaminants such as dust or debris or by liquid droplets or streams of liquid resulting from rain, splashed water from the road surface, or the like. Similar to the moisture level, the degree of impairment in the clarity of the image data may be indicative of the level of obscurement of the transparent surface.

In example embodiments, a method for selectively activating the above-described sensor assembly cleaning apparatus includes determining an activation schedule for the apparatus including a timing and a duration of ejection of the pressurized air onto a plurality of transparent surfaces (e.g., glass windows) of the sensor assembly (e.g., a camera housing of the sensor assembly). In some example embodiments, the activation schedule is determined based on a physical configuration of the transparent surfaces. For instance, in an example embodiment, the apparatus may be activated to eject the pressurized air onto two transparent surfaces determined to be adjacent to one another during time periods that at least partially overlap. This activation schedule may be selected to avoid a scenario that could occur if the adjacent transparent surfaces were cleaned with the pressurized air at different, non-overlapping time periods, that is, a scenario in which ejected air impinging on one transparent surface causes debris, liquid, or the like to travel towards an adjacent transparent surface.

As another non-limiting example, an activation schedule may specify that two non-adjacent transparent surfaces are to be cleaned with the pressurized air during overlapping or substantially overlapping time periods, while a transparent surface located between the two non-adjacent transparent surfaces is to be cleaned during a subsequent, non-overlapping time period. This activation schedule may be selected for a physical configuration of transparent surfaces in which, for example, a first transparent surface and a third transparent surface are non-adjacent and a second transparent surface is the only transparent surface adjacent to the first transparent surface and the only transparent surface adjacent to the third transparent surface. In particular, the first and third transparent surfaces may be cleaned together and first, and even if some debris or liquid travels from these surfaces to the second transparent surface as a result, cleaning the second transparent surface during a subsequent time period ensures that such debris or liquid is removed. In this example scenario, a different activation schedule such as one according to which the first, second, and third transparent surfaces are cleaned in succession during non-overlapping time periods may result in debris or liquid cleaned from one transparent surface ending up on another transparent surface that has already been cleaned, which is not desirable. In other example embodiments, it may, in fact, be desirable to apply the pressurized air to the transparent surfaces in succession during non-overlapping time periods. For example, this activation schedule may selected if the pressurized air is ejected at an angle onto a transparent surface during cleaning such that debris or liquid on the surface may only travel to another transparent surface that has not yet been cleaned with the pressurized air and is unlikely to be pushed onto a transparent surface to which the pressurized air has already been applied.

In example embodiments, the activation schedule may indicate that all transparent surfaces should not be cleaned with the pressurized air simultaneously because this would produce a potentially detrimental pressure drop. More specifically, in some example embodiments, the maximum number of transparent surfaces onto which the pressurized air can be ejected simultaneously may be determined, and the activation schedule may ensure that this number is not exceeded. Further, in some example embodiments, the method for selectively activating the sensor assembly cleaning apparatus may include periodically determining a pressure drop resulting from operation of the apparatus. If the pressure drop becomes too great, an updated activation schedule may be determined and implemented.

In one or more other example embodiments, a sensor assembly cleaning apparatus may additionally include a fluid line for supplying a liquid such as water and a nozzle or the like for ejecting the liquid onto a transparent surface at high pressure. The high pressure liquid may be used to clean debris from the transparent surface. In example embodiments, the liquid may also be used to clean the nozzles, vents, or the like that supply the pressurized air. More specifically, in example embodiments, the water nozzle may be periodically re-positioned during the cleaning process to direct the high pressure water towards the air nozzle to clean debris or dust from the air nozzle to ensure that it continues to be able to supply air at a suitable pressure when activated to remove liquid or debris from the transparent surface. In example embodiments, a respective water nozzle may be positioned in a substantially opposing direction from each air nozzle to ensure that the water nozzle is able to eject high pressure liquid onto the water nozzle with a high degree of impingement.

Example embodiments of the invention provide a number of technical solutions to technical problems faced by conventional apparatuses and methods for cleaning sensor assemblies. For example, some example embodiments of the invention are directed to an improved sensor assembly cleaning apparatus that addresses the technical problem of diminished sensor (e.g., camera) performance resulting from obscurement of a transparent surface of the sensor assembly—or more specifically a transparent surface of a housing for the sensor—by debris, dust, liquid droplets, liquid streams, or the like. The improved sensory assembly cleaning apparatus according to example embodiments of the invention addresses this technical problem by providing a novel and unconventional mechanism in the form of pressurized air ejected onto transparent surfaces of a sensor housing to clean the surfaces and remove objects obscuring the surfaces. This represents a technological improvement over conventional sensor assembly cleaning techniques or apparatuses.

Certain example embodiments of the invention are directed to a method for controlling a sensor assembly cleaning apparatus according to which various parameters are evaluated against corresponding threshold levels/values to determine whether to activate the apparatus to eject the pressurized air to perform a cleaning process on a transparent surface of the sensor assembly. In particular, the apparatus may be activated if the level of obscurement of the transparent surface is greater than a threshold level and/or the velocity of a vehicle to which the apparatus is attached is below a threshold velocity. These parameters—the level of obscurement and the vehicle velocity—indicate, for example, the need for pressurized air cleaning of a transparent surface and the degree to which wind speed due to the vehicle's movement can provide the cleaning function, respectively. This capability to selectively activate the apparatus based on parameters such as these conserves power and reduces wear, and thus, constitutes a technological improvement.

Certain other example embodiments of the invention are directed to a method for selectively activating a sensor assembly cleaning apparatus that includes determining an activation schedule for the apparatus based on, for example, a physical configuration of the transparent surfaces of the sensor assembly to be cleaned by the apparatus and/or a maximum permissible pressure drop resulting from activation the apparatus to eject pressurized air to multiple transparent surfaces simultaneously. This capability to determine and execute an activation schedule for a sensor assembly cleaning apparatus that limits the pressure drop across the apparatus during operation conserves power, reduces wear, and ensures that there is sufficient pressure in the air ejected from the apparatus to clean a transparent surface of the sensor assembly that has been obscured by debris, liquid, or other objects. This capability thus constitutes a further technological improvement of example embodiments of the invention.

Certain other example embodiments of the invention are directed to another sensor assembly cleaning apparatus in which the pressurized water that is used to clean a transparent surface of the sensor assembly is also used to clean air nozzles and/or air vents of the apparatus. More specifically, as previously described, the apparatus includes nozzles and/or vents that are adapted to eject pressurized air onto the transparent surfaces to clean debris or liquid from the surfaces. These air nozzles/vents can become clogged over time with mud, dust, or other debris. According to example embodiments of the invention, existing water nozzles—which eject pressurized water onto transparent surfaces of the sensor assembly during a cleaning operation—can be periodically used to direct the pressurized water to the air nozzle instead to remove any debris that may be clogging the air nozzle. This novel and unconventional use of existing water nozzles to clean air nozzles, which in turn, are used in a novel and unconventional manner to clean liquid or debris from transparent surfaces of a sensor assembly provides enhanced cleaning capability, and as such, improved sensor performance, and thus, represents a technological improvement.

FIG. 1 schematically illustrates a top view of a camera housing 102 that encloses a plurality of cameras in accordance with an example embodiment of the invention. The camera housing 102 may fully enclose a plurality of cameras 104, thereby protecting the cameras 104 from environmental elements. The camera housing 102 and the cameras contained therein may form part of a larger sensor assembly that may include any of a variety of types of sensors (e.g., a LiDAR). The sensor assembly may be attached to an exterior of a vehicle such as an AV and integrated with one or more other vehicle systems. In an example embodiment, the camera housing 102 may include multiple transparent surfaces formed in side surfaces of the housing 102. The transparent surfaces (not shown in FIG. 1) may be, for example, glass windows through which the cameras 104 are provided with fields-of-view of an environment external to the housing 102. More specifically, in an example embodiment, each camera 104 may capture image data of an external environment (e.g., a portion of a vehicle's surrounding environment) via a field-of-view provided by a corresponding transparent surface of the camera housing 102.

The cameras 104 may be arranged within the camera housing in accordance with any suitable physical configuration. For instance, FIG. 1 depicts an example physical configuration of the cameras 104 in which three cameras are positioned in a row adjacent to one side of the housing 102, and individual cameras are located at each of the other sides of the housing 102. It should be appreciated that the physical configuration of the cameras 104 shown in FIG. 1 is purely illustrative and that any number of cameras 104 may be enclosed within the housing 102 and arranged in any suitable manner.

Figure 2:
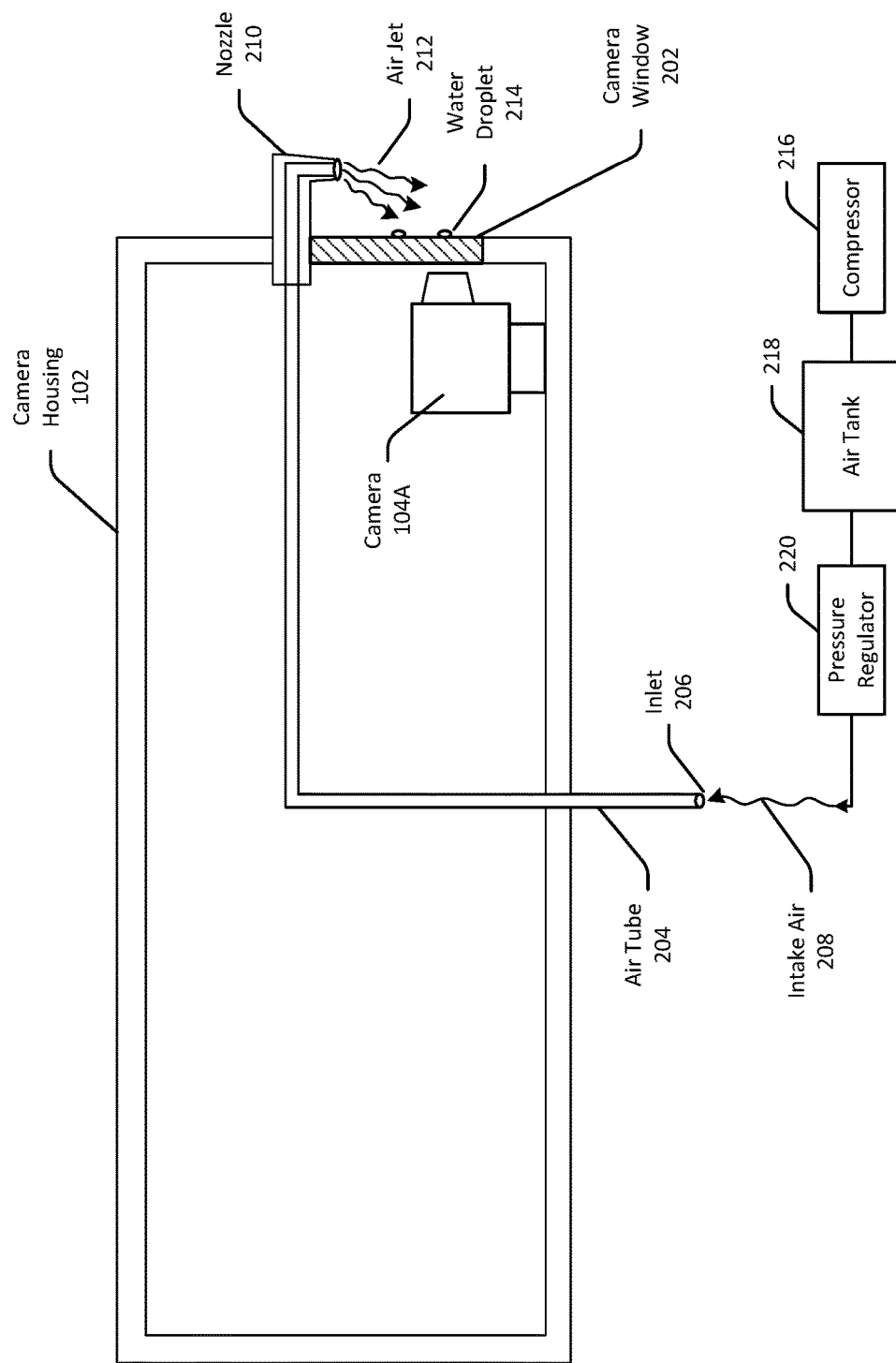
FIG. 2 schematically illustrates a cross-sectional view of the camera housing depicted in FIG. 1 taken along cross-section 'A' that depicts a sensor assembly cleaning apparatus in accordance with another example embodiment of the invention.

FIG. 2 schematically illustrates a cross-sectional view of the camera housing 102 depicted in FIG. 1 taken along cross-section 'A.' FIG. 2 depicts a sensor assembly cleaning apparatus and its configuration in relation to the camera housing 102 in accordance with another example embodiment of the invention. Because example embodiments of the sensor assembly cleaning apparatus and its operation are described herein in connection with a camera housing (e.g., camera housing 102), the apparatus may be interchangeably referred to herein at times as a camera housing cleaning apparatus.

In example embodiments, the cross-sectional side view of FIG. 2 may be taken through a particular camera 104A contained in the camera housing 102. The camera 104A may be positioned adjacent to a transparent surface of the camera housing 102 (e.g., camera window 202). Camera window 202 may be formed in a surface of the camera housing 102 and may be formed of a transparent material such as glass. Camera window 202 may provide a field-of-view via which the camera 104A may capture image data of an external environment.

In example embodiments, the camera housing cleaning apparatus includes a fluid line (e.g., air tube 204) through which intake air 208 can be supplied at an inlet end 206 and ejected at an outlet end via a nozzle 210 or vent. While a single nozzle 210 is depicted, it should be appreciated that multiple nozzles and/or vents may be adapted to eject the pressurized air onto the camera window 202. The intake air 208 may be ejected as a pressurized air jet 212. The pressurized air jet 212 may have sufficient air pressure to remove debris or liquid droplets or streams 214 from the camera window 202. For instance, dust or other particle debris may be forced towards an edge of the camera window 202 and ultimately off of the window 202 entirely by the pressurized air jet 212. As another non-limiting example, liquid droplets or streams 214 may be present on the camera window 202 due to operation of a vehicle in the rain or from water splashed onto the camera window 202 from a road surface. These liquid droplets or streams 214 may be forced towards an edge of the camera window 202 and ultimately entirely off of the window 202 by the pressurized air jet 212. In this manner, the pressurized air jet 212 provides a cleaning function to the camera window 202.

In example embodiments, a compressor 216 may be provided to compress air to obtain compressed air. Compressing the air increases the pressure of the air, and as such, the compressed air may be referred to herein as pressurized air. The pressurized air may be stored in an air tank 218. A pressure regulator 220 may be provided to regulate a pressure of the pressurized air. The pressurized air may be sourced from the air tank 218, and may travel through the pressure regulator 220 and be supplied as the intake air 208 to the air tube 204. In some example embodiments, the tube 204 may extend from the pressure regulator 220, through an interior of the camera housing 102, and, ultimately, to the nozzle 210. The air tube 204 may extend through an interior of the housing 102 for space-saving design considerations. Despite potentially extending through an interior of the camera housing 102, however, the tube 204 may serve as barrier between the air therein and other internal components of the camera housing 102 (e.g., the cameras). In other example embodiments, the tube 204 may extend around the camera housing 102 and not through the interior of the housing 102.

In certain other example embodiments, the pressurized air may travel through one or more additional fluid lines and/or one or more additional components (e.g., a gas manifold) from the pressure regulator 220 prior to reaching the air tube 204. Further, in example embodiments, the camera housing cleaning apparatus may include additional fluid lines for directing the pressurized air to additional nozzles or vents adapted to eject the pressurized air onto other transparent surfaces of the camera housing 102 (e.g., other glass windows through which additional cameras 104 contained in the housing 102 capture image data of an environment external to the housing 102).

Figure 3:
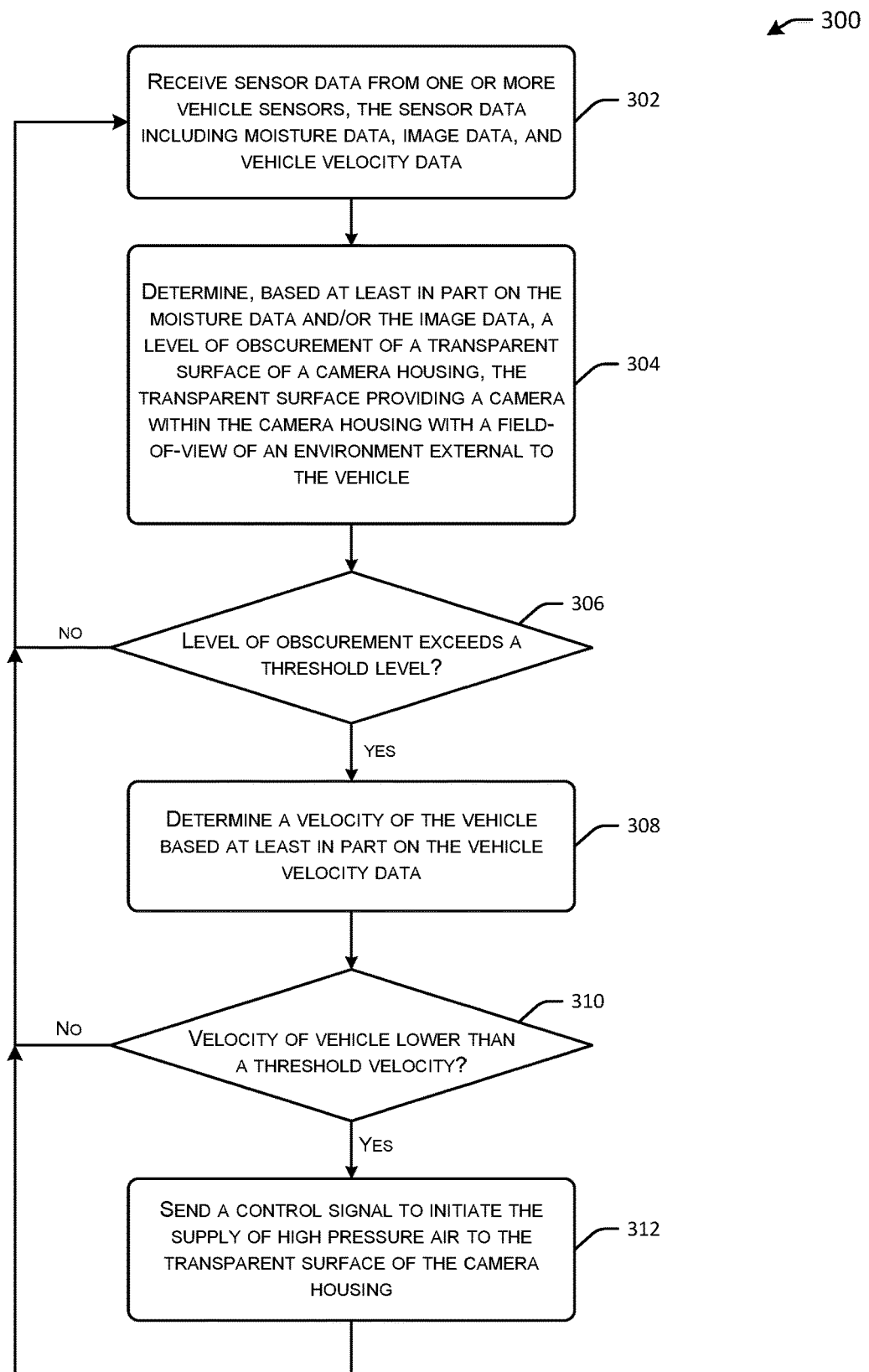
FIG. 3 is a process flow diagram of an illustrative method for controlling operation of a sensor assembly cleaning apparatus in accordance with an example embodiment of the invention.
Figure 4:
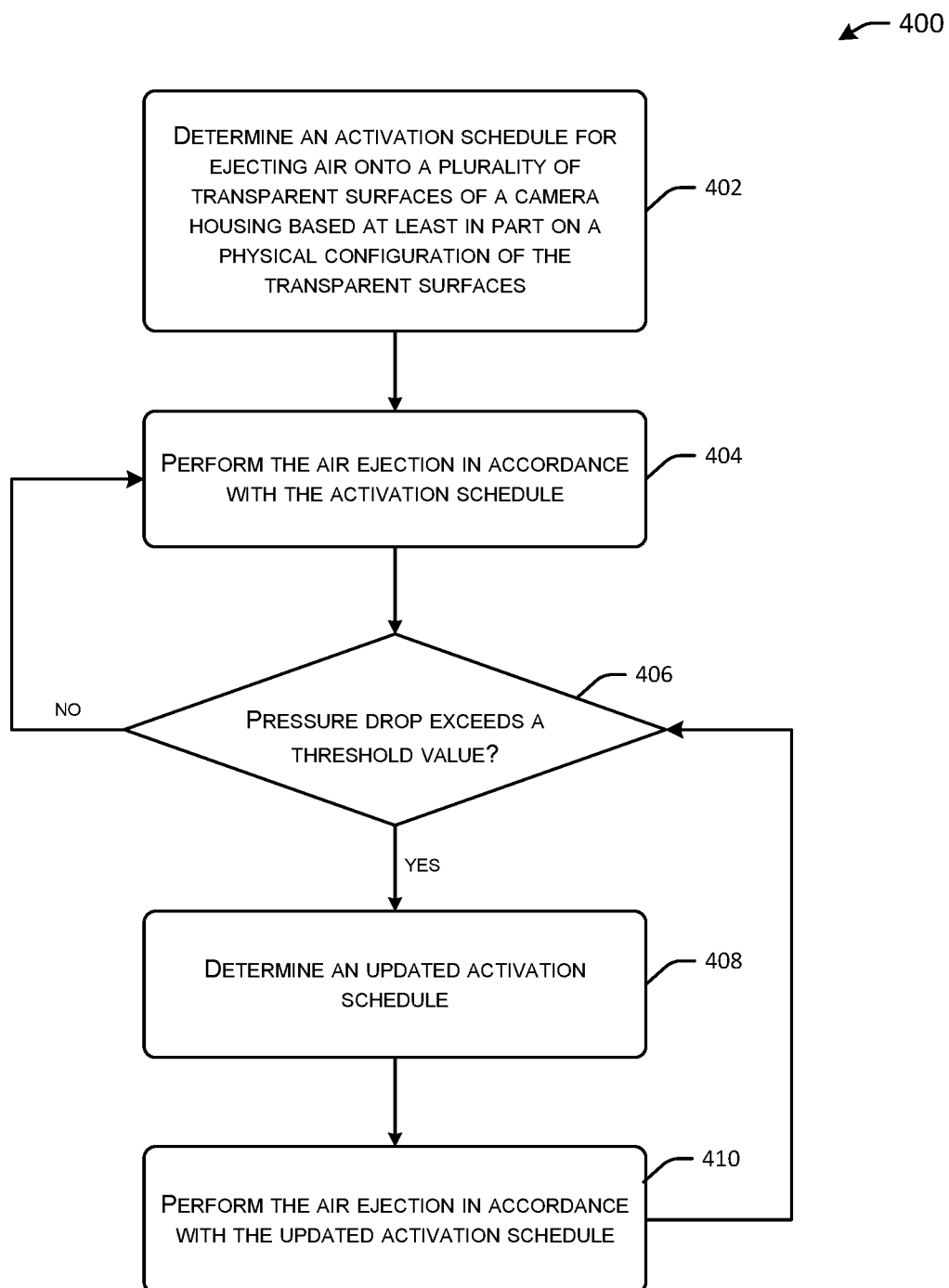
FIG. 4 is a process flow diagram of an illustrative method for determining an activation schedule for operation of a sensor assembly cleaning apparatus and operating the sensor assembly cleaning apparatus based on the activation schedule in accordance with an example embodiment of the invention.

FIG. 3 is a process flow diagram of an illustrative method 300 for controlling operation of a sensor assembly cleaning apparatus in accordance with an example embodiment of the invention. FIG. 4 is a process flow diagram of an illustrative method 400 for determining an activation schedule for operation of a sensor assembly cleaning apparatus and operating the sensor assembly cleaning apparatus in accordance with the activation schedule in accordance with an example embodiment of the invention.

Each operation of any of the methods 300, 400, or 700 (described in more detail later in this disclosure) can be performed by one or more of the engines depicted in FIG. 8. These engines can be implemented in any combination of hardware, software, and/or firmware. In certain example embodiments, one or more of these engines can be implemented, at least in part, as software and/or firmware modules that include computer-executable instructions that when executed by a processing circuit cause one or more operations to be performed. In example embodiments, these engines may be customized computer-executable logic implemented within a customized computing chip such as an FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Referring first to FIG. 3, at block 302 of the method 300, sensor data is received from various vehicle sensors. The sensor data may include, for example, moisture data received from a moisture or rain sensor, image data captured by a camera (e.g., the camera 104A) enclosed in a camera housing (e.g., the camera housing 102), vehicle velocity data, and so forth. The sensor data may further include, without limitation, LiDAR data, radar data, and so forth. In example embodiments, the sensor data may include one or both of the moisture data and the image data. Further, in example embodiments, the moisture data may be indicative of a moisture level of a transparent surface of the camera housing (e.g., the camera window 202). For instance, if the vehicle is being operated in the rain, the moisture data may indicate a high moisture level due to the presence of rain droplets/streams of water on the transparent surface. In some example embodiments, the image data may reflect images captured by a camera through the transparent surface. If the transparent surface contains objects that obscure the camera's view (e.g., dust/other debris, liquid droplets, streams of liquid, etc.), then the image may be of poor quality.

At block 304 of the method 300, a fluid ejection determination engine (which may be executing on a computing device such as an embedded controller provided locally in the vehicle or on a remote server) may determine a level of obscurement of the transparent surface based at least in part on the sensor data. For instance, in some example embodiments, the fluid ejection determination engine may determine the level of obscurement based on moisture data that is indicative of a moisture level of the transparent surface. If, for example, the vehicle is being operated in the rain, the moisture data may indicate a high moisture level due to rain droplets on the transparent surface. The level of obscurement may be correlated to the moisture level indicated by the moisture data. For example, as the moisture level rises, the determined level of obscurement of the transparent surface may proportionately rise as well.

In other example embodiments, the fluid ejection determination engine may determine the level of obscurement based on image data included in the sensor data. The image data may indicate an obscured view of a camera through the transparent surface. Similar to the moisture level, the degree of impairment in the clarity of the image data due to debris or liquid present on the transparent surface may be indicative of the level of obscurement of the transparent surface. That is, as the degree of impairment in the clarity of the image data increases, the level of obscurement of the transparent surface may proportionately increase.

Then, at block 306 of the method 300, the fluid ejection determination engine may determine whether the level of obscurement exceeds a threshold level. If the level of obscurement of the transparent surface does not exceed the threshold value, a negative determination may be made at block 306, and the method 300 may continue iteratively from block 302, where additional sensor data is received. If, on the other hand, the transparent surface is obscured beyond the threshold level (a positive determination at block 306), the method 300 may optionally further evaluate the vehicle velocity in relation to a threshold vehicle velocity. In other example embodiments, the level of obscurement of the transparent surface and its relation to the threshold level may alone determine whether the camera housing cleaning apparatus is activated. In still other example embodiments, the vehicle velocity and its relation to a threshold velocity may alone dictate whether the apparatus is activated.

In still other example embodiments, if only one of the above-described conditions is met (e.g., only the level of obscurement exceeds the threshold level or only the vehicle velocity is less than the threshold velocity), the deviation between the corresponding parameter and the threshold value may need to exceed a certain value in order for the apparatus to be triggered to supply the pressurized air. For instance, in some example embodiments, if the vehicle velocity is above the threshold velocity, the level of obscurement of the transparent surface may need to exceed the threshold level by more than a predetermined value (or vice versa) before the pressurized air is supplied. In some example embodiments, if, for example, the vehicle velocity exceeds the threshold velocity by an amount x, then the level of obscurement of the transparent surface may need to exceed the threshold level by at least kx, where k is a multiplicative factor that can take on any real number value greater than 1, or vice versa.

In some example embodiments, the fluid ejection determination engine may evaluate patterns/trends present in the moisture/image data and/or vehicle velocity data to determine whether the apparatus should be triggered to supply the pressurized air to the transparent surface. In some example embodiments, the fluid ejection determination engine may analyze sensor data received over a period of time to determine whether any moisture and/or vehicle velocity trends are present. For instance, if the moisture data indicates that moisture levels of the transparent surface are continuously trending upwards but have not yet reached a level that would cause the level of obscurement of the transparent surface to exceed the threshold level, the fluid ejection determination engine may nonetheless determine that the pressurized air should be supplied from the apparatus in anticipation that the moisture levels will continue to rise and the level of obscurement will exceed the threshold level in the near future. The fluid ejection determination engine may similarly evaluate the vehicle velocity data to determine if any similar trends are present in that data. For instance, if the velocity data indicates that the vehicle is continuously decelerating, the fluid ejection determination engine may predict that the velocity of the vehicle will be below the threshold velocity in the near future, and as a result, may proactively trigger the supply of the pressurized air.

In other example embodiments, rather than triggering the supply of the pressurized air when the level of obscurement of the transparent surface exceeds the threshold level, the supply of the pressurized air may be triggered when the level of obscurement is within X % of the threshold level. Similarly, in some example embodiments, the supply of the pressurized air may be triggered when the vehicle velocity is within Y % of the threshold velocity. In some other example embodiments, the flow rate or ejection velocity of the pressurized air may be a function of how close the level of obscurement of the transparent surface or the vehicle velocity is to the threshold obscurement level or threshold velocity, whichever the case may be. For instance, the flow rate or ejection velocity of the pressurized air may be at a maximum permissible level if the level of obscurement exceeds the threshold and/or the vehicle velocity is below the threshold velocity. Then, for any level of obscurement less than the threshold level, the reduction in the maximum permissible level of the flow rate or ejection velocity may be proportional to the difference between the level of obscurement and the threshold level. For instance, if the level of obscurement of the transparent surface is 20% percent less than the threshold level, then the flow rate or ejection velocity may be 80% of the maximum permissible level. Similarly, for any vehicle velocity above the threshold velocity, the reduction in the maximum permissible level of the flow rate or ejection velocity may be proportional to the difference between the vehicle velocity and the threshold velocity. For instance, if the vehicle velocity is 20% percent above the threshold velocity, then the flow rate or ejection velocity may be 80% of the maximum permissible level.

More specifically, at block 308 of the method 300, the fluid ejection determination engine may determine a velocity of the vehicle from vehicle velocity data included in the sensor data. It should be appreciated that velocity, as that term is used herein, may simply connote a speed of the vehicle (e.g., a scalar quantity) or a speed and a direction of the vehicle (e.g., a vector quantity). At block 310, the fluid ejection determination engine may determine whether the velocity of the vehicle is less than a threshold velocity. If the vehicle velocity is determined to be less than the threshold vehicle velocity (a positive determination at block 310)—which may indicate that the vehicle velocity is insufficient to generate enough naturally circulating wind around the transparent surface to produce a desired cleaning effect—a fluid ejection control engine may send a control signal to the camera housing cleaning apparatus at block 312 to initiate the ejection of pressurized air onto the transparent surface. The fluid ejection control engine may execute on a computing device such as an embedded controller provided locally in the vehicle or on a remote server.

Referring to FIG. 2 for explanatory purposes, the fluid ejection control engine may send an ON signal at block 312 that causes a valve or the like at the inlet 206 to open allowing the pressurized intake air 208 to enter the tube 204 and/or that causes a valve or the like at an outlet end of the tube 204 to open to permit ejection of the pressurized air jet 212 onto the transparent surface. On the other hand, if the fluid ejection determination engine determines that the vehicle velocity is not less than the threshold velocity (a negative determination at block 310), the method 300 may proceed iteratively from block 302, where additional sensor data is received.

The example method 300 may be executed to determine whether to activate a camera housing cleaning apparatus to supply pressurized air to a particular transparent surface based on a level of obscurement of the transparent surface and/or a vehicle velocity. FIG. 4 illustrates an example method 400 for determining an activation schedule for supplying pressurized air to multiple transparent surfaces of the camera housing (e.g., multiple camera windows). The activation schedule may specify the timing for ejecting the pressurized air onto the various transparent surfaces and duration of time that the air is ejected onto each transparent surface.

Referring now to FIG. 4, at block 402 of the method 400, a fluid ejection timing determination engine (which may be executing on a computing device such as an embedded controller provided locally in the vehicle or on a remote server) may determine an activation schedule for ejecting the pressurized air onto a plurality of transparent surfaces of a camera housing. In example embodiments, the fluid ejection timing determination engine may determine the activation schedule based on a physical configuration of the transparent surfaces.

For instance, in an example embodiment, the camera housing cleaning apparatus may be activated to eject the pressurized air onto two transparent surfaces determined to be adjacent to one another during time periods that at least partially overlap. This activation schedule may be selected to avoid a scenario that could occur if the adjacent transparent surfaces were cleaned with the pressurized air at different, non-overlapping time periods, that is, a scenario in which ejected air impinging on one transparent surface causes debris, liquid, or the like to travel towards an adjacent transparent surface.

As another non-limiting example, an activation schedule may specify that two non-adjacent transparent surfaces are to be cleaned with the pressurized air during overlapping or substantially overlapping time periods, while a transparent surface located between the two non-adjacent transparent surfaces is to be cleaned during a subsequent, non-overlapping time period. This activation schedule may be selected for a physical configuration of transparent surfaces in which, for example, a first transparent surface and a third transparent surface are non-adjacent and a second transparent surface is the only transparent surface adjacent to both the first and the third transparent surfaces. In particular, the first and third transparent surfaces may be cleaned together and first, and even if some debris or liquid travels from these surfaces to the second transparent surface as a result, cleaning the second transparent surface during a subsequent time period ensures that such debris or liquid is removed. In this example scenario, a different activation schedule such as one according to which the first, second, and third transparent surfaces are cleaned in succession during non-overlapping time periods may result in debris or liquid being cleaned from one transparent surface ending up on another transparent surface that has already been cleaned, which is not desirable.

In other example embodiments, it may, in fact, be desirable to apply the pressurized air to the transparent surfaces in succession during non-overlapping time periods. For example, this activation schedule may selected if the pressurized air is ejected at an angle onto a transparent surface during cleaning such that debris or liquid on the surface may only travel to another transparent surface that has not yet been cleaned with the pressurized air and is unlikely to be pushed onto a transparent surface to which the pressurized air has already been applied.

In example embodiments, the fluid ejection timing determination engine may further determine the activation schedule based on an associated pressure drop that would occur. For instance, in some example embodiments, all transparent surfaces should not be cleaned with the pressurized air simultaneously because this would produce a potentially detrimental pressure drop. More specifically, in some example embodiments, the maximum permissible number of transparent surfaces onto which the pressurized air can be ejected simultaneously may be determined, and the activation schedule may ensure that this number is not exceeded.

Referring again to FIG. 4, at block 404 of the method 400, the fluid ejection control engine may send a control signal to activate the cleaning apparatus such that the apparatus performs the pressurized air ejection in accordance with the determined activation schedule. In some example embodiments, the method 400 may include periodically determining a pressure drop across the apparatus during operation. In particular, referring again to FIG. 4, at block 406 of the method 400, the fluid ejection timing determination engine may determine whether a pressure drop resulting from operation of the cleaning apparatus exceeds a threshold drop in pressure. In response to a negative determination at block 406, the apparatus may continue to operate in accordance with the activation schedule determined at block 402. The pressure drop across the apparatus may continue to be compared to the threshold value periodically.

If, on the other hand, the pressure drop does exceed the threshold value (a positive determination at block 406), the method 400 may proceed to block 408, where the fluid ejection timing determination engine may determine an updated activation schedule for the cleaning apparatus. The updated activation schedule may, for example, reduce the amount of time that multiple air nozzles are simultaneously ejecting pressurized air; eliminate overlapping activation of multiple air nozzles altogether; reduce the maximum number of air nozzles that are simultaneously activated for any period of time; reduce the maximum number of air nozzles that are simultaneously activated for more than a threshold period of time; reduce the amount of time that any given air nozzle is activated; and so forth.

At block 410 of the method 400, the fluid ejection control engine may send an ON control signal to the camera housing cleaning apparatus to initiate operation of the apparatus in accordance with the activation schedule. The example modifications described above made to the activation schedule to obtain the updated activation schedule may result in a smaller pressure drop during operation of the apparatus in accordance with the updated activation schedule as compared to operation of the apparatus in accordance with the original activation schedule.

Figure 5A:
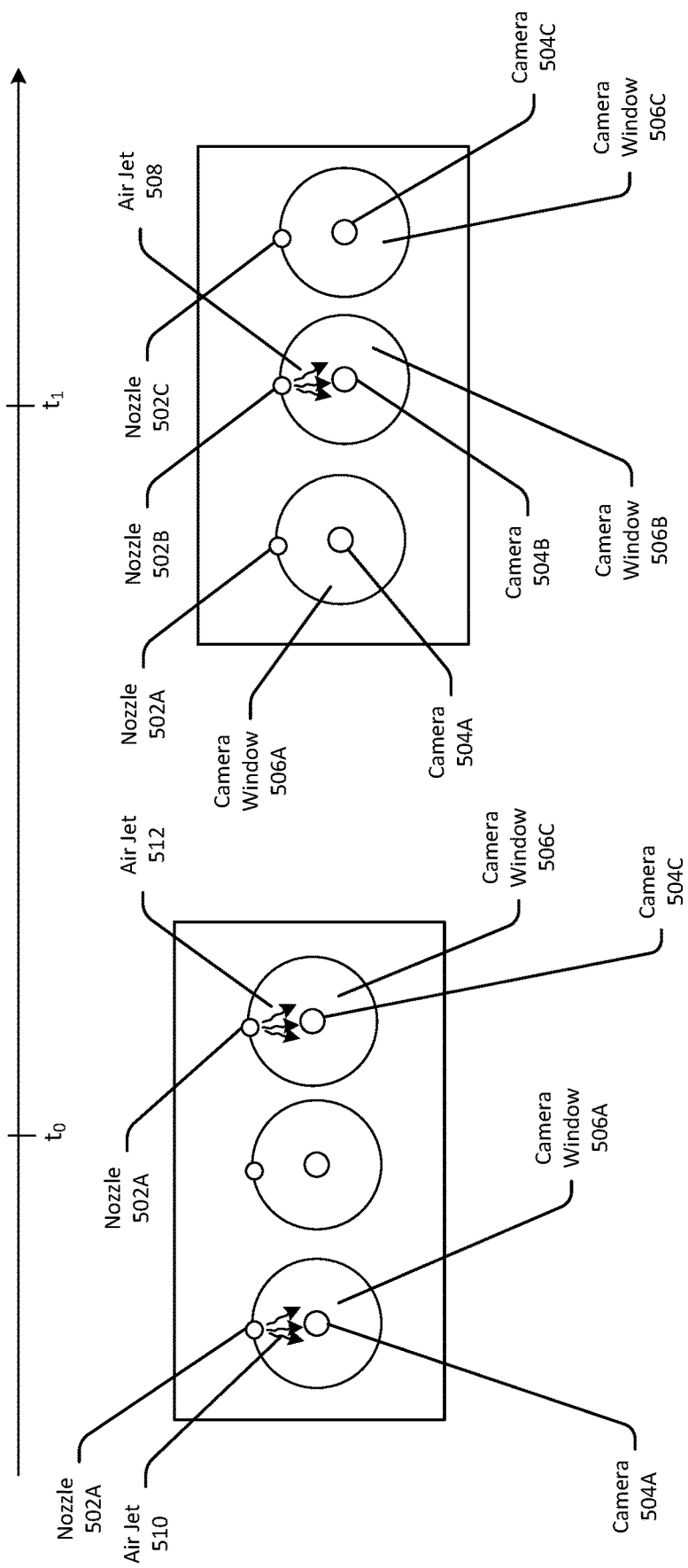
FIG. 5A schematically illustrates an example activation schedule for a sensor assembly cleaning apparatus in accordance with an example embodiment of the invention.

FIG. 5A schematically illustrates an example activation schedule for a sensor assembly cleaning apparatus in accordance with an example embodiment of the invention. A surface (or portion of a surface) of a camera housing is depicted. Transparent surfaces (e.g., camera windows) 506A, 506B, 506C are formed in various surfaces of the camera housing. The camera windows 506A, 506B, 506C may provide respective fields-of-view of an environment external to the camera housing for cameras 504A, 504B, 504C, respectively. The camera windows 506A, 506B, 506C are illustratively shown as being substantially horizontally aligned. Further, assume that the second camera window 506B is the only transparent surface adjacent to first camera window 506A and the only transparent surface adjacent to the third camera window 506C. Nozzles 502A, 502B, 502C are provided with respect to camera windows 506A, 506B, 506C, respectively. Each nozzle 502A, 502B, 502C may be adapted to eject pressurized air onto a corresponding camera window.

In an example embodiment, the activation schedule illustratively depicted in FIG. 5A may specify that the two non-adjacent transparent surfaces (i.e., camera window 504A and camera window 504C) are to be cleaned with the pressurized air during overlapping or substantially overlapping time periods, while a transparent surface located between the two non-adjacent transparent surfaces (i.e., the camera window 506B) is to be cleaned during a subsequent, non-overlapping time period. For instance, according to this example activation schedule, nozzle 502A would be activated to eject air jet 510 onto camera window 506A and nozzle 502C would be activated to eject air jet 512 onto camera window 506C during a same first time period that includes time $t_0$ or during substantially overlapping time periods that both include the time $t_0$. Then, during a subsequent time period that includes time ti and that does not overlap with the time period(s) during which the nozzles 502A and 502C are activated, the nozzle 502B may be activated to eject air jet 508 onto the camera window 506B.

The example activation schedule depicted in FIG. 5A may be selected for any physical configuration of transparent surfaces in which, for example, a first transparent surface and a third transparent surface are non-adjacent and a second transparent surface is the only transparent surface adjacent to the first transparent surface as well as the only transparent surface adjacent to the third transparent surface. In particular, with such example configurations, the first and third transparent surfaces (e.g., camera windows 506A, 506C) may be cleaned substantially together and first, and even if some debris or liquid travels from these surfaces to the second transparent surface (e.g., camera window 506B) as a result, cleaning the second transparent surface during a subsequent time period ensures that such debris or liquid is removed. In this example scenario, a different activation schedule such as one according to which the first, second, and third transparent surfaces are cleaned in succession during non-overlapping time periods may result in debris or liquid being cleaned from one transparent surface ending up on another transparent surface that has already been cleaned, which is not desirable.

Figure 5B:
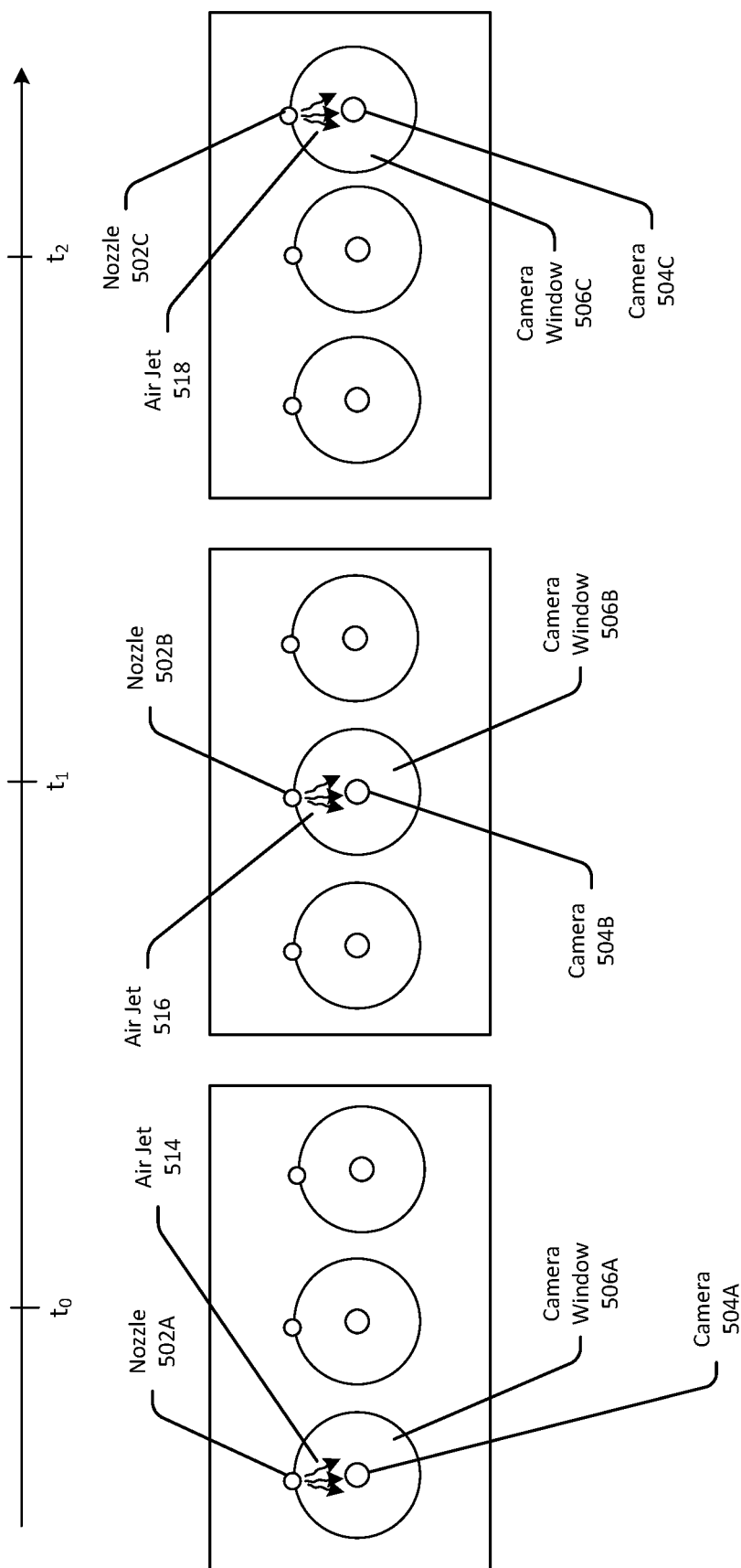
FIG. 5B schematically illustrates an example activation schedule for a sensor assembly cleaning apparatus in accordance with another example embodiment of the invention.

In other example embodiments, however, it may, in fact, be desirable to apply the pressurized air to the transparent surfaces in succession during non-overlapping time periods. FIG. 5B depicts such an example activation schedule. While only three transparent surfaces (e.g., camera windows 506A, 506B, 506C) are depicted in FIG. 5B, it should be appreciated that additional camera windows may be provided adjacent to the camera window 506A and/or the camera window 506C. Assume, for example, that the nozzles 502A, 502B, 502C are positioned such that the pressurized air is ejected at an angle onto a corresponding camera window 506A, 506B, 506C. In particular, the nozzles 502A, 502B, 502C may be angled such that debris or liquid ejected from any given camera window can only reasonably travel, if at all, onto another camera window that is located on a particular side of the given camera window. For instance, based on the positioning of the nozzles 502A, 502B, 502C liquid or debris ejected from the camera window 506A can only reasonably travel to camera window 506B, and liquid or debris ejected from the camera window 506B can only reasonably travel to the camera window 506C.

Based on the physical configuration of the camera windows 506A, 506B, 506C and the physical positioning of the nozzles 502A, 502B, 502C, an activation schedule may be determined and executed according to which the nozzle 502A is activated during a first time period to eject air jet 514 onto the camera window 506A; nozzle 502B is activated during a second time period to eject air jet 516 onto the camera window 506B; and nozzle 502C is activated during a third time period to eject air jet 518 onto the camera window 506A. The first, second, and third time periods may be initiated at successively later times and may be completely or substantially non-overlapping. According to this activation schedule and based on the physical configuration (arrangement) of the camera windows 506A, 506B, 506C and the nozzles 502A, 502B, 502C, debris or liquid on a camera window can only reasonably travel to another camera window that has not yet been cleaned with the pressurized air and is unlikely to be pushed onto a camera window to which the pressurized air has already been applied.

Figure 6A:
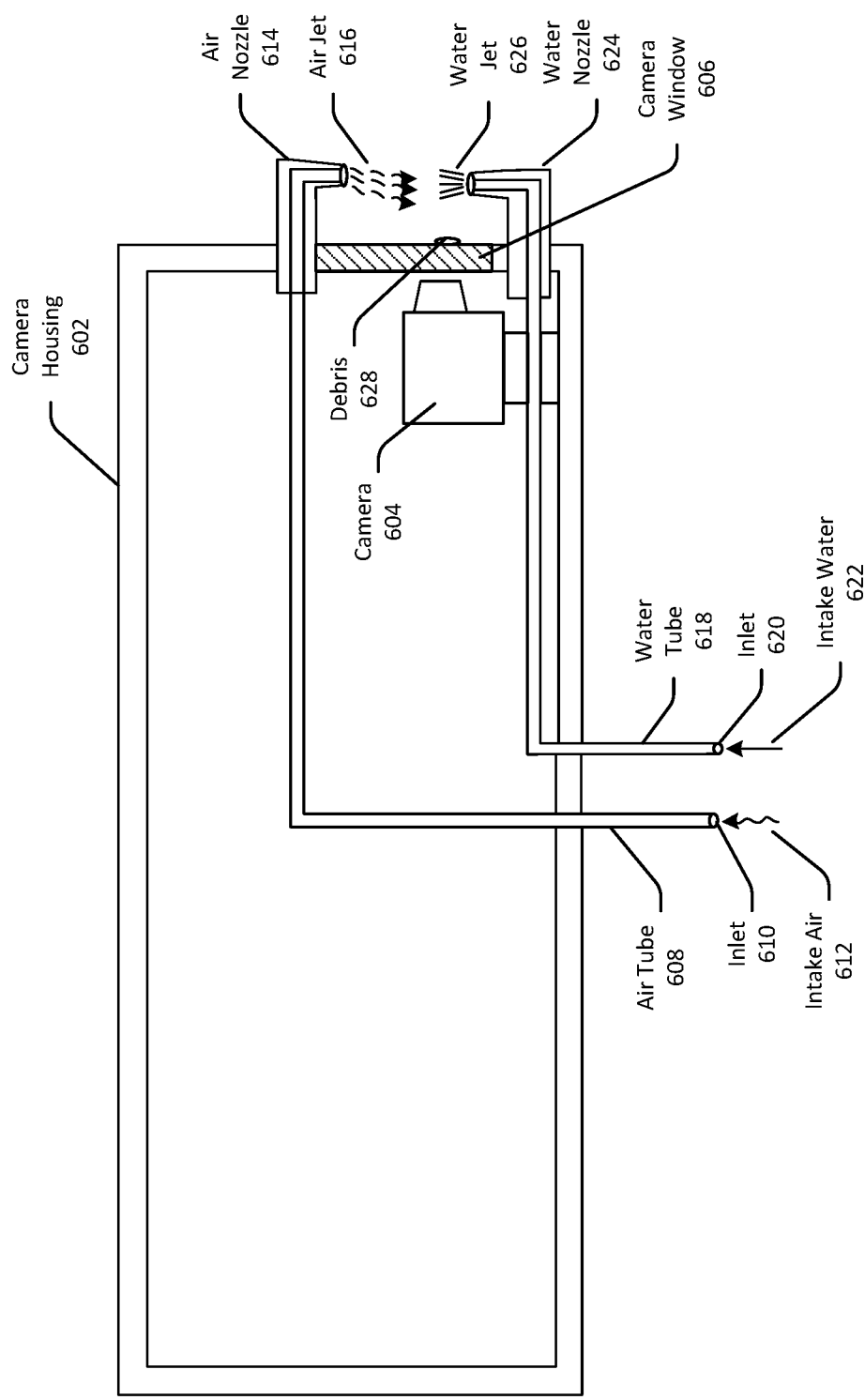
FIG. 6A schematically illustrates a side cross-sectional view of a camera housing that depicts an example sensor assembly cleaning apparatus in accordance with another example embodiment of the invention.

FIG. 6A schematically illustrates a side cross-sectional view of a camera housing 602 that depicts an example sensor assembly cleaning apparatus in accordance with another example embodiment of the invention. In example embodiments, the cross-sectional side view of FIG. 6A may be taken through a particular camera 604 contained in the camera housing 602. The camera 604 may be positioned adjacent to a transparent surface of the camera housing 602 (e.g., camera window 606). Camera window 606 may be formed in a surface of the camera housing 602 from a transparent material such as glass. Camera window 602 may provide a field-of-view via which the camera 604 may capture image data of an external environment.

Similar to the camera housing cleaning apparatus according to the example embodiment depicted in FIG. 2, the camera housing cleaning apparatus according to the example embodiment depicted in FIG. 6A includes a fluid line (e.g., air tube 608) through which intake air 612 can be supplied at an inlet end 610 and ejected at an outlet end via an air nozzle 614 or vent. While a single nozzle 614 is depicted, it should be appreciated that multiple air nozzles and/or air vents may be adapted to eject pressurized air onto the camera window 606. The intake air 612 may be ejected as a pressurized air jet 616. As previously described, the pressurized air jet 616 may have sufficient air pressure to remove debris or liquid droplets or streams from the camera window 606. In this manner, the pressurized air jet 616 provides a cleaning function to the camera window 606.

The example camera housing cleaning apparatus depicted in FIG. 6A may further include a fluid line (e.g., water tube 618) via which intake water 622 can be supplied at an inlet 620 of the tube 618 and ejected from a water nozzle 624 as water jet 626 onto the camera window 606. The water jet 626 may be a high-pressure water jet that is activated during a cleaning process designed to remove debris 628 on the camera window 606 that may be too strongly adhered to the camera window 606 to be removed by the pressurized air jet 616.

In example scenarios, the air nozzle 614 may become clogged from mud or other debris. This can impair the function of the air nozzle 614, potentially causing an undesirable pressure drop across the nozzle 614, which may result in the air jet 616 lacking sufficient pressure to adequately remove debris or liquid from the camera window 606. According to example embodiments of the invention, the water nozzle 624 may be used to periodically clean the air nozzle 614 during a cleaning operation involving the water nozzle 624. More specifically, while a cleaning operation is being performed during which the high pressure water jet 626 is ejected from the water nozzle 624 onto the camera window 606, the water nozzle 624 may be periodically re-positioned to eject the high pressure water jet 626 towards and onto the air nozzle 614 to remove any debris that may be clogging the air nozzle 614. Impingement of the air nozzle 614 with the high pressure water jet 626 may occur periodically for a limited duration of time.

Figure 6B:
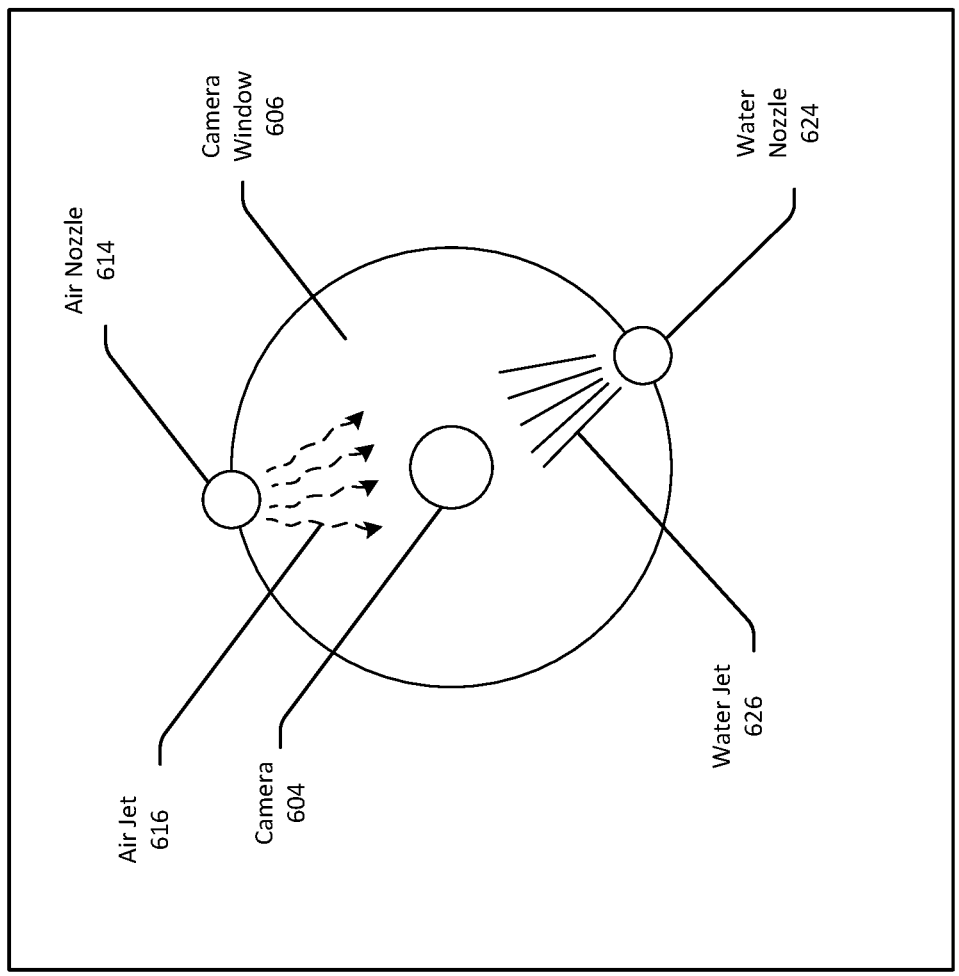
FIG. 6B schematically illustrates a side view of the example sensor assembly cleaning apparatus depicted in FIG. 6A.

In some example embodiments, it may not be necessary to positionally adjust the water nozzle 624 prior to ejecting the water jet 626 onto the air nozzle 614 as the water nozzle 624 may already be located in a sufficiently opposing position to the air nozzle 614. For example, as shown in FIG. 6B, the water nozzle 624 may be located at a position that is substantially directly opposite from a position at which the air nozzle 614 is located. In this manner, the water jet 626 ejected from the water nozzle 624 may provide substantially continuous cleaning function to the air nozzle 614 while performing a cleaning operation on the camera window 606. In some example embodiments, despite being positioned substantially opposite to the air nozzle 614, the water nozzle 624 may nonetheless be positionally adjustable to allow for the water jet 626 to directed towards different portions of the camera window 606. It should be appreciated that in other example embodiments, the water nozzle 624 may not be positioned opposite to the air nozzle 614, but may be positionally adjustable to direct the water jet 626 towards the air nozzle 614 periodically.

Figure 7:
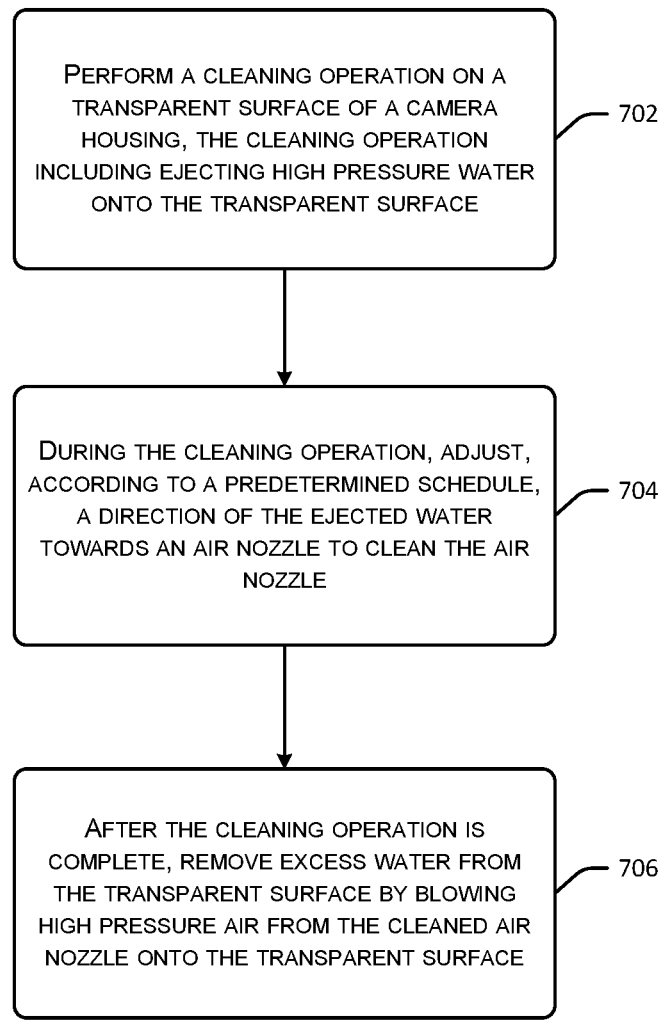
FIG. 7 is a process flow diagram of an illustrative method of operation of the sensor assembly cleaning apparatus depicted in FIGS. 6A and 6B in accordance with an example embodiment of the invention.

FIG. 7 is a process flow diagram of an illustrative method 700 of operation of the sensor assembly cleaning apparatus depicted in FIGS. 6A and 6B in accordance with an example embodiment of the invention. At block 702 of the method 700, the camera housing cleaning apparatus (e.g., the apparatus depicted in FIGS. 6A and 6B) may perform a cleaning operation on a transparent surface (e.g., camera window 606), which may include ejecting the high pressure water (e.g., the water jet 626) onto the transparent surface.

At block 704 of the method 700, during the cleaning operation, a direction of the ejected water may be adjusted towards an air nozzle to clean the air nozzle according to a predetermined schedule. More specifically, a positioning of the water nozzle 624 may be adjusted to direct the water jet 626 in the direction of the air nozzle 614 to remove mud or other debris from the air nozzle 614. The predetermined schedule may call for a periodic re-positioning of the water nozzle 626 to direct the water jet 626 towards the air nozzle 614 for limited durations of time during the cleaning operation performed on the camera window 606 by the water nozzle 626. As previously noted, in other example embodiments, periodic re-positioning of the water nozzle 624 may be unnecessary if the water nozzle 624 is already located in a directly opposing position to the air nozzle 614.

At block 706 of the method 700, after the cleaning operation performed by the water nozzle 624 is complete, the cleaned air nozzle 614 may be activated to eject the pressurized air jet 616 on the camera window 606. In this manner, any liquid droplets or streams remaining from the cleaning operation performed by the water nozzle 624 may be removed by the air jet 616 from the camera window 606.

Hardware Implementation

Figure 8:
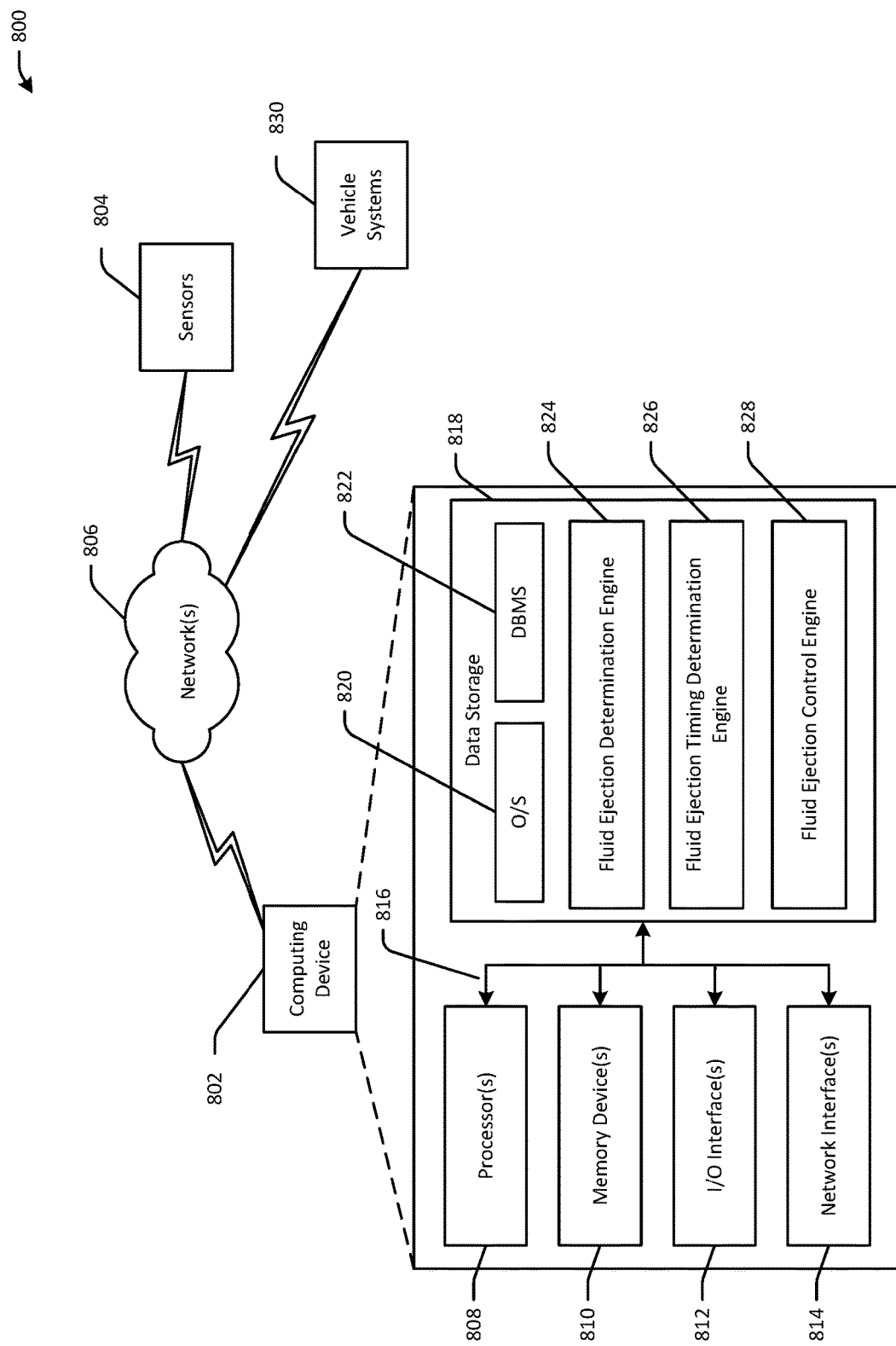
FIG. 8 is a schematic block diagram illustrating an example networked architecture configured to implement example embodiments of the invention.

FIG. 8 is a schematic block diagram illustrating an example networked architecture 800 configured to implement example embodiments of the invention. The networked architecture 800 can include one or more special-purpose computing devices 802 communicatively coupled via one or more networks 806 to various sensors 804 and other vehicle systems 828. In example embodiments, the sensors 804 may include any of the example types of on-board vehicle sensors previously described including, without limitation, LiDAR sensors, radars, cameras, GPS receivers, sonar-based sensors, IMUs, accelerometers, gyroscopes, magnetometers, FIR sensors, and so forth. The special-purpose computing device(s) 802 may include devices that are integrated with a vehicle and may receive sensor data from the sensors 804 via a local network connection (e.g., WiFi, Bluetooth, Dedicated Short Range Communication (DSRC), or the like). In other example embodiments, the special-purpose computing device(s) 802 may be provided remotely from a vehicle and may receive the sensor data from the sensors 804 via one or more long-range networks. The vehicle system(s) 828 may include sensor assembly cleaning apparatuses described herein. Further, the vehicle system(s) 828 may additionally include an in-vehicle infotainment system or other mechanical and/or electrical systems of a vehicle.

The special-purpose computing device(s) 802 may be hard-wired to perform the techniques described herein; may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The special-purpose computing device(s) 802 may also combine custom hard-wired logic, ASICs, or FPGAs with custom programming to accomplish the techniques. The special-purpose computing device(s) 802 may be desktop computer systems, server computer systems, portable computer systems, handheld devices, networking devices or any other device or combination of devices that incorporate hard-wired and/or programmed logic to implement the techniques.

The special-purpose computing device(s) may be generally controlled and coordinated by operating system software 820, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device(s) 802 may be controlled by a proprietary operating system. The operating system software 820 may control and schedule computer processes for execution; perform memory management; provide file system, networking, and I/O services; and provide user interface functionality, such as a graphical user interface ("GUI").

While the computing device(s) 802, the sensors 804, and/or the vehicle system(s) 828 may be described herein in the singular, it should be appreciated that multiple instances of any such component can be provided and functionality described in connection any particular component can be distributed across multiple instances of such a component. In certain example embodiments, functionality described herein in connection with any given component of the architecture 800 can be distributed among multiple components of the architecture 800. For example, at least a portion of functionality described as being provided by a computing device 802 may be distributed among multiple such computing devices 802.

The network(s) 806 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 806 can have any suitable communication range associated therewith and can include, for example, global networks (e.g., the Internet), metropolitan area networks (MANs), wide area networks (WANs), local area networks (LANs), or personal area networks (PANs). In addition, the network(s) 806 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 802 can include one or more processors (processor(s)) 808, one or more memory devices 810 (generically referred to herein as memory 810), one or more input/output ("I/O") interface(s) 812, one or more network interfaces 814, and data storage 818. The computing device 802 can further include one or more buses 816 that functionally couple various components of the computing device 802. The computing device 802 may also include various engines including a fluid ejection determination engine 824, a fluid ejection timing determination engine 826, and a fluid ejection control engine 828. These engines may be implemented in any combination of software, hardware, or firmware. While these engines are illustratively depicted as software/firmware modules stored in the data storage 818, it should be appreciated that the engines may include hard-wired logic, customized logic of a persistently programmed customized computing device such as an ASIC or FPGA, or the like. Each of the engines may include logic for performing any of the processes and tasks described earlier in connection with correspondingly named engines.

The bus(es) 816 can include at least one of a system bus, a memory bus, an address bus, or a message bus, and can permit the exchange of information (e.g., data (including computer-executable code), signaling, etc.) between various components of the computing device 802. The bus(es) 816 can include, without limitation, a memory bus or a memory controller, a peripheral bus, an accelerated graphics port, and so forth. The bus(es) 816 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 810 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 810 can include multiple different types of memory such as various types of static random access memory (SRAM), various types of dynamic random access memory (DRAM), various types of unalterable ROM, and/or writeable variants of ROM such as electrically erasable programmable read-only memory (EE-PROM), flash memory, and so forth. The memory 810 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.).

The data storage 818 can include removable storage and/or non-removable storage including, but not limited to, magnetic storage, optical disk storage, and/or tape storage. The data storage 818 can provide non-volatile storage of computer-executable instructions and other data. The memory 810 and the data storage 818, removable and/or non-removable, are examples of computer-readable storage media (CRSM) as that term is used herein. The data storage 818 can store computer-executable code, instructions, or the like that can be loadable into the memory 810 and executable by the processor(s) 808 to cause the processor(s) 808 to perform or initiate various operations. The data storage 818 can additionally store data that can be copied to memory 810 for use by the processor(s) 808 during the execution of the computer-executable instructions. Moreover, output data generated as a result of execution of the computer-executable instructions by the processor(s) 808 can be stored initially in memory 810 and can ultimately be copied to data storage 818 for non-volatile storage.

More specifically, the data storage 818 can store one or more operating systems (O/S) 820 and one or more database management systems (DBMS) 822 configured to access the memory 810 and/or one or more external datastore(s) potentially via one or more of the networks 806. In addition, the data storage 818 may further store one or more program modules, applications, engines, computer-executable code, scripts, or the like. For instance, any of the engines described herein may be implemented as software and/or firmware that includes computer-executable instructions (e.g., computer-executable program code) loadable into the memory 810 for execution by one or more of the processor(s) 808 to perform any of the techniques described herein.

Although not depicted in FIG. 8, the data storage 818 can further store various types of data utilized by engines of the computing device 802. Such data may include, without limitation, sensor data (e.g., temperature data, vehicle velocity data, moisture data, etc.); map data; threshold values; and so forth. Any data stored in the data storage 818 can be loaded into the memory 810 for use by the processor(s) 808 in executing computer-executable program code. In addition, any data stored in the data storage 818 can potentially be stored in one or more external datastores that are accessible via the DBMS 822 and loadable into the memory 810 for use by the processor(s) 808 in executing computer-executable instructions/program code.

The processor(s) 808 can be configured to access the memory 810 and execute computer-executable instructions/program code loaded therein. For example, the processor(s) 808 can be configured to execute computer-executable instructions/program code of the various program modules to cause or facilitate various operations to be performed in accordance with one or more embodiments of the invention. The processor(s) 808 can include any suitable processing unit capable of accepting data as input, processing the input data in accordance with stored computer-executable instructions, and generating output data. The processor(s) 808 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 808 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 808 can be made capable of supporting any of a variety of instruction sets.

Referring now to other illustrative components depicted as being stored in the data storage 818, the O/S 820 can be loaded from the data storage 818 into the memory 810 and can provide an interface between other application software executing on the computing device 802 and hardware resources of the computing device 802. More specifically, the O/S 820 can include a set of computer-executable instructions for managing hardware resources of the computing device 802 and for providing common services to other application programs. In certain example embodiments, the O/S 820 can include or otherwise control execution of one or more of the program modules stored in the data storage 818. The O/S 820 can include any operating system now known or which can be developed in the future including, but not limited to, any server operating system, any mainframe operating system, or any other proprietary or non-proprietary operating system.

The DBMS 822 can be loaded into the memory 810 and can support functionality for accessing, retrieving, storing, and/or manipulating data stored in the memory 810, data stored in the data storage 818, and/or data stored in external datastore(s). The DBMS 822 can use any of a variety of database models (e.g., relational model, object model, etc.) and can support any of a variety of query languages. The DBMS 822 can access data represented in one or more data schemas and stored in any suitable data repository. Datastore(s) that may be accessible by the computing device 802 via the DBMS 822, can include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 802, the input/output (I/O) interface(s) 812 can facilitate the receipt of input information by the computing device 802 from one or more I/O devices as well as the output of information from the computing device 802 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the computing device 802 or can be separate therefrom. The I/O devices can further include, for example, any number of peripheral devices such as data storage devices, printing devices, and so forth.

The I/O interface(s) 812 can also include an interface for an external peripheral device connection such as universal serial bus (USB), FireWire, Thunderbolt, Ethernet port or other connection protocol that can connect to one or more networks. The I/O interface(s) 812 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 802 can further include one or more network interfaces 814 via which the computing device 802 can communicate with any of a variety of other systems, platforms, networks, devices, and so forth. The network interface(s) 814 can enable communication, for example, with the sensors 804 and/or one or more other devices via one or more of the network(s) 806. In example embodiments, the network interface(s) 814 provide a two-way data communication coupling to one or more network links that are connected to one or more of the network(s) 806. For example, the network interface(s) 814 may include an integrated services digital network (ISDN) card, a cable modem, a satellite modem, or a modem to provide a data communication connection to a corresponding type of telephone line. As another non-limiting example, the network interface(s) 814 may include a local area network (LAN) card to provide a data communication connection to a compatible LAN (or a wide area network (WAN) component to communicate with a WAN). Wireless links may also be implemented. In any such implementation, the network interface(s) 814 may send and receive electrical, electromagnetic, or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP, in turn, may provide data communication services through the world wide packet data communication network now commonly referred to as the "Internet". Local networks and the Internet both use electrical, electromagnetic, or optical signals that carry digital data streams. The signals through the various network(s) 804 and the signals on network links and through the network interface(s) 814, which carry the digital data to and from the computing device 802, are example forms of transmission media. In example embodiments, the computing device 802 can send messages and receive data, including program code, through the network(s) 806, network links, and network interface(s) 814. For instance, in the Internet example, a server might transmit a requested code for an application program through the Internet, the ISP, a local network, and a network interface 814. The received code may be executed by a processor 808 as it is received, and/or stored in the data storage 818, or other non-volatile storage for later execution.

It should be appreciated that the engines depicted in FIG. 8 as part of the computing device 802 are merely illustrative and not exhaustive. In particular, functionality can be modularized in any suitable manner such that processing described as being supported by any particular engine can alternatively be distributed across multiple engines, program modules, components, or the like, or performed by a different engine, program module, component, or the like. Further, one or more depicted engines may or may not be present in certain embodiments, while in other embodiments, additional engines not depicted can be present and can support at least a portion of the described functionality and/or additional functionality. In addition, various engine(s), program module(s), script(s), plug-in(s), Application Programming Interface(s) (API(s)), or any other suitable computer-executable code hosted locally on the computing device 802 and/or hosted on other computing device(s) accessible via one or more of the network(s) 806, can be provided to support functionality provided by the engines depicted in FIG. 8 and/or additional or alternate functionality. In addition, engines that support functionality described herein can be implemented, at least partially, in hardware and/or firmware and can be executable across any number of computing devices 802 in accordance with any suitable computing model such as, for example, a client-server model, a peer-to-peer model, and so forth.

It should further be appreciated that the computing device 802 can include alternate and/or additional hardware, software, and/or firmware components beyond those described or depicted without departing from the scope of the invention. More particularly, it should be appreciated that software, firmware, and/or hardware components depicted as forming part of the computing device 802 are merely illustrative and that some components may or may not be present or additional components may be provided in various embodiments. It should further be appreciated that each of the engines depicted and described represent, in various embodiments, a logical partitioning of supported functionality. This logical partitioning is depicted for ease of explanation of the functionality and may or may not be representative of the structure of software, hardware, and/or firmware for implementing the functionality.

In general, the terms engine, program module, or the like, as used herein, refer to logic embodied in hardware, firmware, and/or circuitry, or to a collection of software instructions, possibly having entry and exit points, written in a programming language, such as, for example, Java, C or C++. A software engine/module may be compiled and linked into an executable program, installed in a dynamic link library, or may be written in an interpreted programming language such as, for example, BASIC, Perl, or Python. It will be appreciated that software engines/modules may be callable from other engines/modules or from themselves, and/or may be invoked in response to detected events or interrupts. Software engines/modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. "Open source" software refers to source code that can be distributed as source code and/or in compiled form, with a well-publicized and indexed means of obtaining the source, and optionally with a license that allows modifications and derived works. Software instructions may be embedded in firmware and stored, for example, on flash memory such as erasable programmable read-only memory (EPROM). It will be further appreciated that hardware modules/engines may include connected logic units, such as gates and flip-flops, and/or may be further include programmable units, such as programmable gate arrays or processors.

Example embodiments are described herein as including engines or program modules. Such engines/program modules may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a stand-alone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a field programmable gate array (FPGA) or an application specific integrated circuit (ASIC). A hardware engine may also include programmable logic or circuitry that is temporarily configured by software to perform certain operations. For example, a hardware engine may include a general-purpose processor or other programmable processor configured by software, in which case, the configured processor becomes a specific machine uniquely tailored to perform the configured functions and no longer constitute general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the term "engine" or "program module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations of example methods described herein may be distributed among multiple processors, not only residing within a single machine, but deployed across a number of machines. In some example embodiments, the processors may be located in a single geographic location (e.g., within a home environment, an office environment, or a server farm). In other example embodiments, the processors may be distributed across a number of geographic locations.

The present invention may be implemented as a system, a method, and/or a computer program product. The computer program product may include a computer readable storage medium (or media) having computer readable program instructions embodied thereon for causing a processor to carry out aspects of the present invention.

The computer readable storage medium is a form of non-transitory media, as that term is used herein, and can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, and non-transitory media more generally, may include non-volatile media and/or volatile media. A non-exhaustive list of more specific examples of a computer readable storage medium includes the following: a portable computer diskette such as a floppy disk or a flexible disk; a hard disk; a random access memory (RAM), a read-only memory (ROM), an erasable programmable read-only memory (EPROM or Flash memory), a static random access memory (SRAM), or any other memory chip or cartridge; a portable compact disc read-only memory (CD-ROM); a digital versatile disk (DVD); a memory stick; a solid state drive; magnetic tape or any other magnetic data storage medium; a mechanically encoded device such as punch-cards or raised structures in a groove having instructions recorded thereon or any physical medium with patterns of holes; any networked versions of the same; and any suitable combination of the foregoing.

Non-transitory media is distinct from transmission media, and thus, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Non-transitory media, however, can operate in conjunction with transmission media. In particular, transmission media may participate in transferring information between non-transitory media. For example, transmission media can include coaxial cables, copper wire, and/or fiber optics, including the wires that include at least some of the bus(es) XXX. Transmission media can also take the form of acoustic or light waves, such as those generated during radio-wave and infra-red data communications.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various features and processes described above may be used independently of one another or may be combined in various ways. All possible combinations and sub-combinations are intended to fall within the scope of the invention.

In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed partially, substantially, or entirely concurrently, or the blocks may sometimes be executed in the reverse order, depending upon the functionality involved.

It should be emphasized that many variations and modifications may be made to the above-described embodiments, the elements of which are to be understood as being among other example embodiments of the invention. All such modifications and variations are intended to be included herein within the scope of the invention. While example embodiments of the invention may be referred to herein, individually or collectively, by the term "invention," this is merely for convenience and does not limit the scope of the invention to any single disclosure or concept if more than one is, in fact, disclosed. The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being redefined herein to be restricted to including any specific characteristics of the features or aspects of the invention with which that terminology is associated.

The embodiments illustrated herein are described in sufficient detail to enable those skilled in the art to practice the teachings disclosed. Other embodiments may be used and derived therefrom, such that structural and logical substitutions and changes may be made without departing from the scope of the invention. The Detailed Description, therefore, is not to be taken in a limiting sense, and the scope of various embodiments is defined only by the appended claims, along with the full range of equivalents to which such claims are entitled.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

As used herein, the term "or" may be construed in either an inclusive or exclusive sense. Moreover, plural instances may be provided for resources, operations, or structures described herein as a single instance. Additionally, boundaries between various resources, operations, program modules, engines, and/or datastores are somewhat arbitrary, and particular operations are illustrated in a context of specific illustrative configurations. Other allocations of functionality are envisioned and may fall within a scope of various embodiments of the invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the invention as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

What is claimed is:

1. An apparatus for cleaning a sensor assembly, the apparatus comprising:
   air nozzles that eject a fluid onto respective transparent surfaces of the sensor assembly;
   one or more processors configured to:
      control a flow rate or an ejection velocity of a first air nozzle based on a velocity at which the sensor assembly is moving and a level of obscurement of a respective first transparent surface;
      determine a number of non-adjacent transparent surfaces on which to simultaneously eject the fluid based on a resulting pressure drop, after a first simultaneous ejection of the fluid, across the air nozzles being within a threshold pressure drop; and
      simultaneously eject the fluid onto the determined number of the non-adjacent transparent surfaces, wherein the first air nozzle ejects the fluid onto the respective first transparent surface and a second air nozzle ejects the fluid onto an adjacent transparent surface with respect to the respective first transparent surface at a different time; and
   a fluid line that supplies the fluid to the air nozzles.

2. The apparatus of claim 1, wherein the fluid is pressurized air.

3. The apparatus of claim 2, wherein the first air nozzle is positionally adjustable to enable ejection of the pressurized air onto different portions of the transparent surface of the sensor assembly.

4. The apparatus of claim 2, wherein the first air nozzle is positionally adjustable to enable ejection of the pressurized air onto different portions of the respective first transparent surface of the sensor assembly.

5. The apparatus of claim 4, wherein the sensor assembly is mounted on a vehicle, and wherein the respective first transparent surface is a glass camera window that provides the at least one of the plurality of cameras with a field-of-view of the environment external to the camera housing.

6. The apparatus of claim 4, wherein the ejected pressurized air causes at least one of liquid or debris present on the respective first transparent surface to disperse towards an edge of the respective first transparent surface.

7. The apparatus of claim 4, further comprising:
a compressor for compressing air to obtain the pressurized air;
a tank for storing the pressurized air; and
a pressure regulator for regulating a pressure of the pressurized air.

8. The apparatus of claim 7, wherein the fluid line delivers the pressurized air from the pressure regulator to the first air nozzle.

9. The apparatus of claim 8, wherein a portion of the fluid line extends through the camera housing.

10. The apparatus of claim 8, wherein the fluid line extends around the camera housing.

11. The apparatus of claim 8, wherein the fluid line is a first fluid line, the apparatus further comprising a second fluid line for supplying the pressurized air to the second air nozzle.

12. A sensor assembly cleaning apparatus comprising:
air nozzles that eject a first fluid onto respective transparent surfaces of the sensor assembly;
one or more processors configured to:
control a flow rate or an ejection velocity of a first air nozzle based on a velocity at which the sensor assembly is moving and a level of obscurement of a respective first transparent surface;
determine a number of non-adjacent transparent surfaces on which to simultaneously eject the first fluid based on a resulting pressure drop, after a first simultaneous ejection of the first fluid, across the air nozzles being within a threshold pressure drop; and
simultaneously eject the fluid onto the determined number of the non-adjacent transparent surfaces, wherein the first air nozzle ejects the first fluid onto the respective first transparent surface and a second air nozzle ejects the first fluid onto an adjacent transparent surface with respect to the respective first transparent surface at a different time;
a fluid line that supplies the first fluid to the first air nozzle; and
a water nozzle that ejects a second fluid onto the first transparent surface.

13. The sensor assembly cleaning apparatus of claim 12, wherein the first fluid is pressurized air and the first air nozzle ejects the pressurized air onto the respective first transparent surface.

14. The sensor assembly cleaning apparatus of claim 13, wherein the second fluid is water.

15. The sensor assembly cleaning apparatus of claim 14, wherein the water nozzle periodically ejects the water towards the first air nozzle to clean debris from the first air nozzle.

16. The sensor assembly cleaning apparatus of 15, wherein the water nozzle and the first air nozzle are disposed at opposing positions to enable the water nozzle to periodically eject the water towards the first air nozzle.

17. The apparatus of claim 1, wherein the controlling of the flow rate or the ejection velocity of the first air nozzle is correlated to the level of obscurement and inversely correlated to the velocity at which the sensor assembly is moving.

18. The apparatus of claim 1, wherein the controlling of the flow rate or the ejection velocity of the first air nozzle is based on a predicted future moisture level of the respective first transparent surface and a predicted future velocity of the sensor assembly.

* * * * *